United States Patent
Zirngast et al.

(10) Patent No.: US 7,854,909 B2
(45) Date of Patent: Dec. 21, 2010

(54) METHOD AND DEVICE FOR TREATING A FINE-PARTICLED FEEDSTOCK ESPECIALLY CONTAINING METAL

(75) Inventors: Johann Zirngast, Mautern (AT); Albert Zschetzsche, Ottensheim (AT)

(73) Assignee: POSCO (KR)

( * ) Notice: Subject to any disclaimer, the term of this patent is extended or adjusted under 35 U.S.C. 154(b) by 1132 days.

(21) Appl. No.: 10/494,840

(22) PCT Filed: Oct. 23, 2002

(86) PCT No.: PCT/EP02/11828

§ 371 (c)(1),
(2), (4) Date: Jul. 1, 2004

(87) PCT Pub. No.: WO03/040417

PCT Pub. Date: Mar. 15, 2003

(65) Prior Publication Data

US 2005/0053529 A1    Mar. 10, 2005

(30) Foreign Application Priority Data

Nov. 9, 2001    (AT)  ........................ A 1773/2001

(51) Int. Cl.
*C01G 1/00*        (2006.01)
*C21B 11/00*     (2006.01)
*B01D 11/00*     (2006.01)

(52) U.S. Cl. .............. 423/148; 423/138; 423/150.3; 423/150.5; 75/392; 75/443; 75/444

(58) Field of Classification Search ............... 110/245; 422/139, 147; 423/138, 148, 150.3, 150.5; 75/392, 443, 444
See application file for complete search history.

(56) References Cited

U.S. PATENT DOCUMENTS 3,421,884 A * 1/1969 Pfeiffer et al. .............. 423/148

(Continued)

FOREIGN PATENT DOCUMENTS

EP         0 092 622        11/1983

(Continued)

OTHER PUBLICATIONS

Japanese Office Action transmitted Aug. 24, 2010 in corresponding Japanese Patent Application No. 2003-542662, with English translation of relevant portions thereof.

*Primary Examiner*—Jessica L Ward
*Assistant Examiner*—Devang R Patel
(74) *Attorney, Agent, or Firm*—Ostrolenk Faber LLP

(57) ABSTRACT

A process for treating a finely particulate, in particular metal-containing, charge material: The charge material and a treatment gas, in particular a reduction gas, are introduced into a fluidized bed chamber of a fluidized bed reactor to form a fluidized bed. After at least partial reaction in the fluidized bed, the treatment gas is discharged from the fluidized bed and, outside the fluidized bed, is at least partially reprocessed, preferably oxidized, by an exothermic, chemical reaction with a reactant, preferably with a gaseous and/or liquid oxidizing agent. The thermal energy of this reaction is at least partially introduced into the fluidized bed chamber, in particular into the fluidized bed, or being discharged therefrom to affect the temperature of the particulate material above the bed. Also an apparatus for operating such a fluidized bed includes the chamber, lines into and out of the chamber for gas and material and a cyclone at the chamber for the material.

19 Claims, 1 Drawing Sheet

U.S. PATENT DOCUMENTS

| | | | |
|---|---|---|---|
| 4,469,050 A * | 9/1984 | Korenberg | 122/4 D |
| 4,579,070 A * | 4/1986 | Lin et al. | 110/345 |
| 4,725,409 A * | 2/1988 | Wolf | 422/145 |
| 4,818,371 A * | 4/1989 | Bain et al. | 208/106 |
| 4,854,249 A * | 8/1989 | Khinkis et al. | 110/342 |
| 5,368,824 A | 11/1994 | Nell et al. | |
| 6,241,801 B1 * | 6/2001 | Kepplinger et al. | 75/414 |

FOREIGN PATENT DOCUMENTS

| | | |
|---|---|---|
| JP | 11-131118 | 5/1999 |
| WO | 96 12045 | 4/1996 |
| WO | WO 96/21044 | 7/1996 |

\* cited by examiner

METHOD AND DEVICE FOR TREATING A FINE-PARTICLED FEEDSTOCK ESPECIALLY CONTAINING METAL

BACKGROUND OF THE INVENTION

The invention relates to a process for treating a finely particulate, in particular metal-containing charge material. The charge material and a treatment gas, in particular a reduction gas, are introduced into a fluidized bed chamber, for example into a fluidized bed reactor, in order to form a fluidized bed. The invention also relates to a unit for operating a fluidized bed, for example a fluidized bed reactor.

The efficiency of a fluidized-bed process can be controlled inter alia, by means of the composition of the treatment gas and by means of the temperature in the fluidized bed.

It is known from the prior art to set the temperature of a treatment gas in a fluidized-bed process to a temperature level which is appropriate for the particular application by means of suitable measures, for example by admixing a cooling gas.

SUMMARY OF THE INVENTION

It is an object of the present invention to further develop a process as stated above and an apparatus that can perform the process making it possible to achieve a particularly efficient and therefore economical form of the thermal influencing of a fluidized bed process.

According to the invention, this object is achieved by the process according to the invention and the apparatus according to the invention.

The proposed process is particularly suitable for the treatment, in particular the reduction of a finely particulate metal oxide, in particular a finely particulate iron oxide. However, the invention is not restricted to this particular application, and consequently all statements made in connection with the reduction are to be considered purely as examples.

These specific statements also apply, with appropriate modifications which it will be possible for the person skilled in the art to perform, to all other, in particular equivalent industrial treatments in which a fluidized-bed process is employed. By way of example, the invention may also be employed in the cement industry.

According to a particular embodiment of the process according to the invention, the fluidized bed forms in a partial section, in particular in a lower partial section, of the fluidized-bed chamber, and/or the at least partially reacted treatment gas is reprocessed within the fluidized-bed chamber, preferably above the fluidized bed, and/or the at least partially reprocessed treatment gas is discharged from the fluidized-bed chamber, preferably above the fluidized bed.

According to a particular embodiment of the process according to the invention, a device for reprocessing the treatment gas which has at least partially reacted in the fluidized bed, for example an oxygen burner and/or a oxygen nozzle, is operated in the fluidized-bed chamber above the fluidized bed, with thermal energy being generated or consumed during the at least partial reprocessing, in particular during an, if appropriate exothermic, oxidation, of the treatment gas.

According to a preferred embodiment of the process according to the invention, the thermal energy is generated or consumed above the fluidized bed in the fluidized-bed chamber.

According to a preferred embodiment of the process according to the invention, thermal energy which is generated or consumed above the fluidized bed is introduced into the fluidized-bed chamber above the fluidized bed or removed from the fluidized-bed chamber above the fluidized bed.

According to a preferred embodiment of the process according to the invention, an oxidizing agent, for example oxygen and/or air, is introduced directly into the fluidized-bed chamber above the fluidized bed, if appropriate via the device for reprocessing the treatment gas which is arranged above the fluidized bed in the fluidized-bed chamber, for the purpose of reprocessing the treatment gas.

According to a preferred embodiment of the process according to the invention, the at least partially reacted treatment gas, in particular reduction gas, is at least partially burnt, in particular at least partially oxidized, in the fluidized-bed chamber above the fluidized bed, if appropriate by the device for reprocessing the treatment gas which is arranged above the fluidized bed in the fluidized-bed chamber.

A combustion represents, for example, a chemical reaction in order to obtain thermal energy, for example an exothermic oxidation.

According to a preferred embodiment of the process according to the invention, finely particulate charge material which emerges from the fluidized bed and is in particular at least at times located above the fluidized bed is at least partially heated and/or cooled, if appropriate by the treatment gas, which is guided above the fluidized bed in the fluidized-bed chamber and has been at least partially reprocessed, in particular burnt and/or oxidized and/or heated, and/or by the device for reprocessing the treatment gas itself.

According to a particular embodiment of the process according to the invention, a cyclone is arranged in the fluidized-bed chamber above the fluidized bed, the finely particulate charge material being heated or cooled in the region of the cyclone, in particular of the cyclone inlet, by the treatment gas, which is guided above the fluidized bed in the fluidized-bed chamber and has been at least partially reprocessed, in particular oxidized and/or heated, and/or by the device for reprocessing the treatment gas itself.

According to a particular embodiment of the process according to the invention, the finely particulate charge material, which is situated above the fluidized bed and has been heated or cooled, is at least partially introduced into the fluidized bed, in particular recycled.

According to a preferred embodiment of the apparatus according to the invention, the device for reprocessing the treatment gas which is arranged in the fluidized-bed chamber above the fluidized bed is designed to introduce a liquid and/or solid combustion agent, preferably an oxidizing agent and/or an oxygen carrier, particularly preferably oxygen and/or air, into the fluidized-bed chamber.

According to a preferred embodiment of the apparatus according to the invention, the device for reprocessing the treatment gas which is arranged above the fluidized bed in the fluidized-bed chamber is arranged in the region of the splash zone, so that the finely particulate charge material which is present in the region of the splash zone can be at least partially heated and/or cooled by the device itself and/or by the at least partially reprocessed, in particular oxidized and/or heated, treatment gas.

In this context, the splash zone characterizes that part of the free space above the fluidized bed in which fine and solid particles are thrown up and then at least partially dropped back into the fluidized bed.

According to a particular embodiment of the apparatus according to the invention, the unit has a cyclone which is arranged above the fluidized bed in the fluidized-bed chamber, a dipleg which extends into the fluidized bed adjoining the cyclone outlet if appropriate, and, furthermore, the device for reprocessing the treatment gas which is arranged above the fluidized bed in the fluidized-bed chamber being arranged at the level of the cyclone, in particular the cyclone inlet, and it being possible for the finely particulate charge material, in the region of the cyclone, in particular of the cyclone inlet, to be at least partially heated or cooled by the device itself and/or by the at least partially reprocessed, in particular oxidized, heated treatment gas.

According to a particular embodiment of the invention, a dipleg represents a device for returning material which has been separated out in a cyclone into a fluidized bed.

In various fluidized-bed reduction processes, the charge ore is heated and reduced in countercurrent in 3 to 4 fluidized-bed reactors. In this application, the temperature profile is set by means of the heat content of the reduction gas and the heats of reaction.

Therefore, the thermal budget process management of a corresponding process can be altered only within narrow limits.

The prior art has disclosed external preheating of the reduction gas, but this has proven uneconomical. The partial combustion of reduction gas upstream of the fluidized bed has an adverse effect on the reduction potential of the reduction gas and therefore on the reduction work which can be achieved.

Extensive tests relating to the use of burners, in particular of oxygen burners, in fluidized-bed units have shown that slag formations which destabilize the fluidized-bed process generally occur in the region of the flame on account of the high particle concentration in the fluidized-bed unit. Moreover, in this region reliable flame monitoring and ignition assistance are very difficult to realize.

The present invention optimizes the energy budget, in particular the introduction of energy.

According to the process according to the invention, in a particular embodiment of the invention, at least one oxygen burner is arranged above the fluidized bed in order to increase the fluidized-bed temperature. Compared to conventional burners, the oxygen burner according to the invention is distinguished by the fact that the combustion, in particular the oxidation, of the treatment gas, in particular of the reduction gas, takes place upstream of the oxygen burner, as early as in the fluidized-bed chamber. In its most simple embodiment, the oxygen burner represents a nozzle for feeding an oxygen carrier into the fluidized-bed chamber.

According to a particular embodiment of the process according to the invention, the term oxygen carrier by definition encompasses all oxygen-containing substances and all substances which provide and/or release oxygen under the ambient conditions prevailing in the fluidized-bed chamber for at least partial oxidation of the treatment gas and/or of the finely particulate charge material, i.e. in particular pure oxygen and/or air.

According to a particular embodiment of the invention, as a result of the particles being thrown up out of the fluidized bed, the particles are heated in the free space above the fluidized bed by the oxygen burner and then dropped back into the fluidized bed.

According to a particular embodiment of the invention, the particles or dust, which is heated further, are separated out at an optional cyclone and then returned to the fluidized bed again.

Unlike with the concept of the gas heating upstream of the fluidized bed, according to a particular embodiment of the invention with the proposed arrangement, the reduction potential of the reduction gas only deteriorates downstream of the fluidized bed. This makes it possible to make use of the reduction potential of the gas at an elevated bed temperature.

A high gas temperature when the working gas enters the reactor is prevented. This counteracts the known problems of caking occurring at the distributor bases.

Furthermore, the risk of slag formation (caking) occurring in the region of the fluidized bed or the fluidized-bed chamber is reduced by the lower particle concentration in the region of the flame.

The following particular advantages can be realized by the subject matter of the invention:

efficient and simple flame monitoring and ignition assistance better and more uniform treatment, in particular reduction, on account of the increase in the fluidized-bed temperature while maintaining an approximately constant quality of treatment gas efficient and simple influencing of the temperature profile of the fluidized bed longer service lives of the distributor base higher productivity resulting from improved efficiency of the fluidized-bed process.

The proposed invention has proven particularly efficient when it is employed in a process with a plurality of fluidized beds operated in parallel and/or in series, since in this case the individual fluidized beds can be particularly flexible matched to one another in terms of the temperatures employed.

According to a particular embodiment of the invention, it is possible for the fluidized-bed reaction, for example the reduction of the fine metal oxide, to be carried out in the fluidized bed prior to the further reprocessing of the treatment gas, for example partial combustion, yet nevertheless to control the temperature in the fluidized bed, in particular by means of recycled particles, preferably of the finely particulate charge material.

According to particular embodiments of the invention, the recycling is effected on the one hand by cyclone recycling, for example via a dipleg, and/or on the other hand by the particles which have been thrown out of the fluidized bed dropping back into it. According to these embodiments, heating of the fluidized bed is achieved without the treatment gas being influenced before or during the reaction in the fluidized bed.

BRIEF DESCRIPTION OF THE DRAWING

The invention is explained below, in accordance with a particular, non-limiting embodiment, on the basis of a diagrammatic drawing, in which.

DESCRIPTION OF A PREFERRED EMBODIMENT

Figure 1:
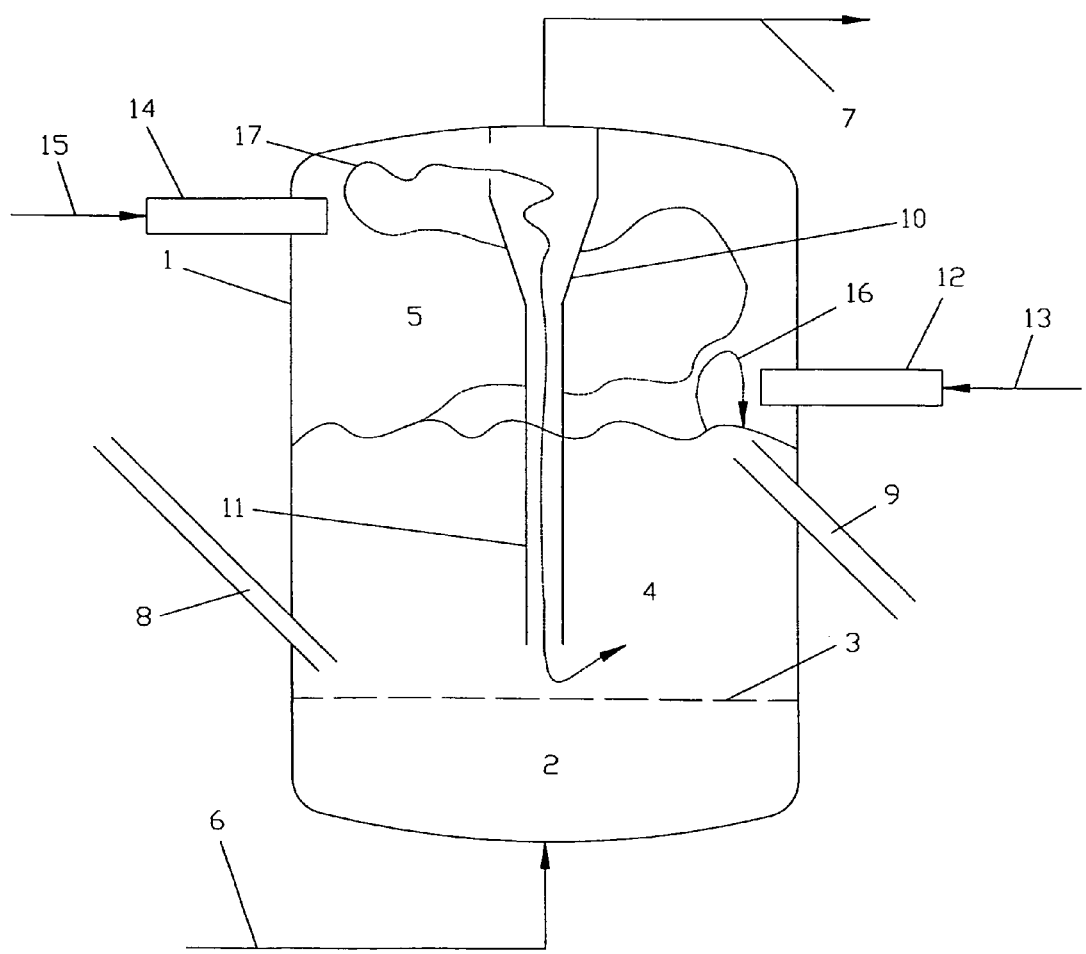
FIG. 1 shows a process for treating a finely particulate, in particular metal-containing, charge material

FIG. 1 shows a unit 1 for operating a fluidized bed, for example a fluidized-bed reactor, which has a wind chamber 2 and a fluidized-bed chamber for holding a fluidized bed 4 and a free space 5. Furthermore, the unit 1 has a distributor base 3 for distributing the treatment gas 6, in particular a reduction gas.

A finely particulate charge material, in particular iron oxide, is fed to the unit 1 via a line 8, and is removed again, in at least partially treated form, via a line 9.

In the unit 1 there is a cyclone 10 and a dipleg 11, which is used to separate out the dust or fine charge material and recycle it into the fluidized bed 4. As is known to the person skilled in the art, the fluidized bed 4 behaves similarly to a boiling liquid and is delimited at the top by a defined, albeit blurred, surface which is diagrammatically depicted in the FIGURE. Immediately above this blurred boundary is what is known as the splash zone, which is distinguished by the occurrence of fine particles therein, which are thrown up out of the fluidized bed and then dropped back into it.

In the fluidized-bed chamber there is an oxygen burner 12 for feeding oxygen 13 into the fluidized-bed chamber above the fluidized bed 4. According to a particular embodiment, the oxygen burner itself is located in the splash zone (as illustrated in FIG. 1) or at any rate is used to introduce heat directly into the splash zone. A particle 16 is heated by the oxygen burner 12 in the splash zone before dropping back into the fluidized bed, thereby making a contribution to the heating of the latter.

According to a further embodiment of the invention, a burner 14 for supplying an oxygen carrier 15 is provided in the region of the cyclone 10, in particular of the cyclone inlet.

In this way, treatment gas is burned in the fluidized-bed chamber and heat is generated above the fluidized bed 4, this heat being used directly to heat the fluidized bed 4 (or to heat it through), for example by means of the solid particles which have been separated out in the cyclone 10 through the dipleg 11.

By way of example the arrow 17 indicates the path of a fine solid particle out of the fluidized bed 4 via the splash zone into the free space 5, this particle being correspondingly heated by the oxygen burner 14 and then recycled into the fluidized bed 4 via the cyclone 10 and the dipleg 11.

The at least partially reacted treatment gas is discharged again via a line 7.

The invention claimed is:

1. A process for treating a finely particulate charge material, the method comprising:
    introducing the charge material and a reduction gas into a fluidized bed chamber from a region external to the fluidized bed chamber and there forming a fluidized bed, the reduction gas not being heated prior to its introduction into the fluidized bed chamber, wherein a cyclone is arranged in the fluidized bed chamber above the fluidized bed;
    at least partially reacting the reduction gas in the fluidized bed, then discharging the reduction gas from the fluidized bed to outside the fluidized bed;
    at least partially reprocessing the exited, at least partially reacted reduction gas in a chemical reaction with a reactant in a device for reprocessing the reduction gas, and operating the device for reprocessing in the fluidized bed chamber above the fluidized bed and there producing thermal energy from the chemical reaction, the device for reprocessing comprising at least one of a burner and a nozzle introducing an oxidizing agent from a region external to the fluidized bed chamber into the fluidized bed chamber;
    at least partially introducing the thermal energy into the fluidized bed chamber or discharging the thermal energy from the fluidized bed chamber, wherein the finely particulate charge material is heated or cooled in the region of the cyclone by the reduction gas above the fluidized bed in the fluidized bed chamber which gas has been at least partially reprocessed and had its temperature affected.

2. The process of claim 1, wherein the fluidized bed chamber is a fluidized bed reactor.

3. The process of claim 2, wherein the at least partial reprocessing of the reduction gas comprises oxidizing the reduction gas in an exothermic chemical reaction with a reactant comprised of at least one of a gaseous or a liquid oxidizing agent.

4. The process of claim 3, wherein the device for reprocessing the reduction gas is at least one of an oxygen burner or an oxygen nozzle and the device for reprocessing is operable in the fluidized bed chamber above the fluidized bed and generating thermal energy,
    and at least partially introducing the thermal energy of the reprocessing device into the fluidized bed or partially discharging the thermal energy for heating or cooling the finely particulate charge material in the region of an inlet to the cyclone, wherein the thermal energy of the chemical reaction is introduced into the fluidized bed by guiding the reduction gas, which has been at least partially pre-processed, into the fluidized bed chamber above the fluidized bed.

5. The process of claim 4, wherein the finely particulate charge material is heated or cooled in the region of the cyclone inlet by either the reduction gas or by the device for reprocessing the reduction gas.

6. The process of claim 3, wherein the finely particulate charge material is a metal-containing charge material.

7. The process of claim 3, wherein the fluidized bed forms in a lower partial section of the fluidized bed chamber, and
    the process further comprising reprocessing the at least partially reacted reduction gas within the fluidized bed chamber above the fluidized bed, and the discharging of at least partially reprocessed reduction gas is from the fluidized bed chamber above the fluidized bed.

8. The process of claim 7, wherein the thermal energy is generated or consumed above the fluidized bed in the fluidized bed chamber.

9. The process of claim 7, further comprising introducing an oxidizing agent into the fluidized bed chamber above the fluidized bed for reprocessing the reduction gas.

10. The process of claim 9, wherein the oxidizing agent is introduced by a device for reprocessing the reduction gas arranged above the fluidized bed in the fluidized bed chamber.

11. The process of claim 9, wherein the oxidizing agent is oxygen or air.

12. The process of claim 2, wherein the at least partially reacted reduction gas is at least partially oxidized in the fluidized bed chamber above the fluidized bed.

13. The process of claim 12, wherein the at least partially reacted reduction gas is at least partially oxidized by a device for reprocessing the reduction gas arranged above the fluidized bed in the fluidized bed chamber.

14. The process of claim 1, wherein the fluidized bed is operable for causing the finely particulate charge material to emerge from the fluidized bed and at least at times to be above the fluidized bed, then heating or cooling the material above the fluidized bed by at least one of the reduction gas which is guided above the fluidized bed in the fluidized bed chamber and which has been partially reprocessed or by the device for reprocessing the reduction gas.

15. The process of claim 14, further comprising at least parllially introducing into the fluidized bed the finely particulate charge material which is above the fluidized bed and has been heated or cooled there.

16. Apparatus for operating a fluidized bed for treating a finely particulate charge material, the apparatus comprising;
    a distributor base operable for distributing a treatment gas;
    a fluidized bed chamber defining the fluidized bed above the base, the fluidized bed chamber having a lower region in which the fluidized bed is disposed; the fluidized bed chamber being operable for reprocessing treatment gas in the fluidized bed chamber above the fluidized bed;

a first line for supplying a finely particulate fluidizable charge material, a second line for discharging treated charge material from a vertical side of the chamber; a third line for introducing treatment gas to the chamber and a fourth line for discharging treatment gas from the chamber;

a cyclone in the fluidized bed chamber arranged above the fluidized bed, the cyclone having an outlet therefrom into the fluidized bed;

a dipleg extending into the fluidized bed and adjoining the cyclone outlet, a device for reprocessing at least partially reacted treatment gas of the fluidized bed, the reprocessing device being located in the fluidized bed chamber above the fluidized bed and the reprocessing device being operable for introducing thermal energy to or discharging the thermal energy from the fluidized bed, the reprocessing device comprising at least two distinct burners introducing an oxidizing agent into the fluidized bed chamber, the two distinct burners being above the fluidized bed, the at least one of the burner and the nozzle including two distinct burners, the two distinct burners being above the fluidized bed, wherein the cyclone has an inlet located in the fluidized bed chamber, the reprocessing device being positioned above the fluidized bed in the fluidized bed chamber in the region of the cyclone inlet enabling the finely particulate charge material then in the region of the cyclone inlet to be heated or cooled by the reprocessing device or by the at least partially reprocessed treatment gas.

17. The apparatus of claim 16, wherein the charge material in the fluidized bed is a finely particulate metal-oxide and the treatment gas is a reduction gas therefor.

18. The apparatus of claim 17, wherein the oxidizing agent is oxygen or air.

19. Apparatus for operating a fluidized bed for treating a finely particulate charge material, the apparatus comprising;

a distributor base operable for distributing a treatment gas;

a fluidized bed chamber defining the fluidized bed above the base, the fluidized bed chamber having a lower region in which the fluidized bed is disposed; the fluidized bed chamber being operable for reprocessing treatment gas in the fluidized bed chamber above the fluidized bed;

a first line for supplying a finely particulate fluidizable charge material, a second line for discharging treated charge material from a vertical side of the chamber; a third line for introducing treatment gas to the chamber and a fourth line for discharging treatment gas from the chamber;

a cyclone in the fluidized bed chamber arranged above the fluidized bed, the cyclone having an outlet therefrom into the fluidized bed;

a dipleg extending into the fluidized bed and adjoining the cyclone outlet, a device for reprocessing at least partially reacted treatment gas of the fluidized bed, the reprocessing device being located in the fluidized bed chamber above the fluidized bed and the reprocessing device being operable for introducing thermal energy to or discharging the thermal energy from the fluidized bed, the reprocessing device comprising at least two distinct burners introducing an oxidizing agent from a region external to the fluidized bed chamber into the fluidized bed chamber, the two distinct burners being above the fluidized bed, the at least one of the burner and the nozzle including two distinct burners, the two distinct burners being above the fluidized bed, wherein there is a splash zone for the particulate material at the fluidized bed caused by the operation of the fluidized bed; and wherein the device for reprocessing treatment gas is arranged above the fluidized bed in the fluidized bed chamber in the splash zone of the fluidized bed for causing heating or cooling of the charge material in the splash zone by the reprocessing device or by the at least partially reprocessed treatment gas.

* * * * *